(No Model.)
W. L. HORNE.
PROCESS OF AGING LIQUORS.
No. 386,748. Patented July 24, 1888.
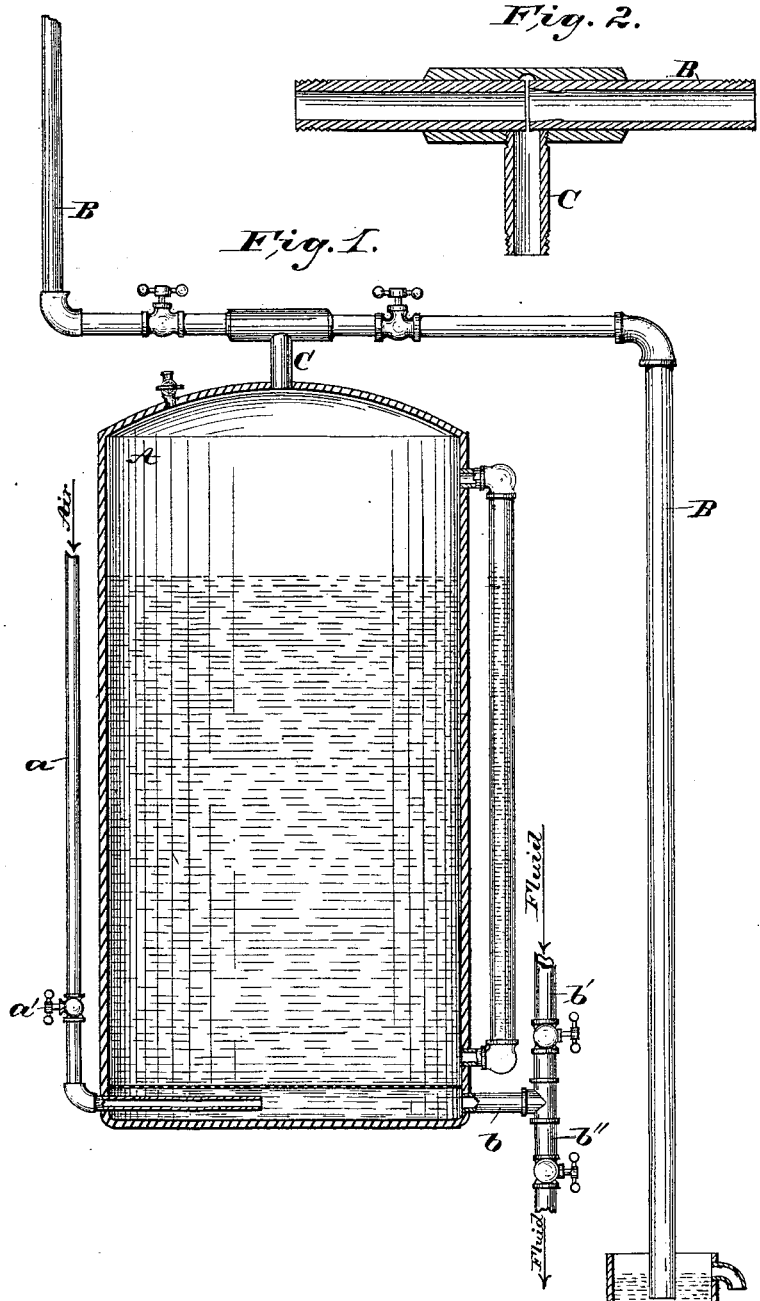

United States Patent Office.

WILLIAM LEWIS HORNE, OF MERIDEN, ASSIGNOR TO THE HORNE VACUUM COMPANY, OF HARTFORD, CONNECTICUT.

PROCESS OF AGING LIQUORS.

SPECIFICATION forming part of Letters Patent No. 386,748, dated July 24, 1888.

Application filed August 24, 1886. Renewed March 29, 1888. Serial No. 268,846. (No model.)

*To all whom it may concern:*

Be it known that I, WILLIAM LEWIS HORNE, a citizen of the United States, residing at Meriden, in the county of New Haven and State of Connecticut, have invented certain new and useful Improvements in the Processes of Aging Liquors; and I do hereby declare the following to be a full, clear, and exact description of the invention, such as will enable others skilled in the art to which it appertains to make and use the same.

It is well known that newly-distilled liquors possess certain crude and acrid properties, which render their use objectionable. These objectionable qualities become less and less as the liquor increases in age. There are also many processes designed to relieve these liquors of such objectionable properties.

My invention is designed to supply a simple and effective means for accomplishing this result in a short space of time, and the process employed is hereinafter fully described, and one form of apparatus which I have devised for carrying the same into effect.

In the accompanying drawings, Figure 1 is a partial sectional elevation of my apparatus. Fig. 2 is a sectional view of a part of the same.

A is an air-tight receptacle of any desired size and form, provided with a glass indicator-tube or with a sheet of glass inserted in the wall of the receptacle, by means of which the condition of the interior of the same can at any time be ascertained by the operator.

$a$ is a pipe or tube, which enters the receptacle A at or near the bottom thereof, and which is provided with a cock, $a'$. The receptacle is also provided with a pipe, $b$, at the bottom, which has branches $b'$ and $b^2$, provided with stop-cocks. The pipe $b'$ is connected with a reservoir of the liquid to be acted upon, and through this the receptacle is filled as often as desired, while the contents of the receptacle after treatment are drawn off through pipe $b^2$ in a manner well known.

Connected with the top of the receptacle A is a vacuum-producing apparatus, for which I have made application for patent in an application bearing date August 24, 1886, and numbered 211,753. This apparatus consists of the pipe B and the pipe or tube $c$, opening into the top of the receptacle A and communicating with the pipe B by one or more small apertures. The lower end of the pipe B may extend downward into the vessel D, which is wholly or partially filled with water, and seals the pipe B.

The operation for the aging of whisky or other distilled liquor which is carried on by means of this apparatus is as follows: The cock in pipes $b^2$ and $a$ being closed, the receptacle A is filled with the newly-distilled liquor to about the point indicated in the drawings. The cock in the pipe $b'$ is then closed and a stream of water is forced under considerable pressure through the pipe B. The water passing rapidly over the aperture or apertures connecting with pipe $c$ immediately begins to exhaust the air from said pipe and from the receptacle. The cock $a'$ is then opened and air is drawn through said pipe into and through said liquid in the receptacle. When this has continued long enough to accomplish all that can be accomplished by passing air through the liquid, the cock $a'$ is closed and the water in pipe B permitted to exhaust the air from the receptacle.

The apparatus which I employ will more nearly produce a perfect vacuum than others with which I am acquainted, and after a close approximation to a vacuum has been reached in the receptacle A the liquor therein will be found to be in a state of ebullition. The operation is continued until ebullition nearly or quite ceases, when the cock in the pipe C is turned, and by opening the cock in the top of the receptacle and pipe the contents are drawn off.

Liquors subjected to the treatment just described will be found to be free from acrid and objectionable qualities of newly-made liquors, and will possess the taste and appearance of liquors of five or more years old.

In the drawings a perforated diaphragm is shown placed across the bottom of the receptacle A over the delivery end of pipe $a$; but this may be dispensed with and the pipe $a$ extended entirely across the receptacle and coiled therein and provided with numerous fine perforations. My apparatus may be considerably varied in other features of construction without departing from the spirit of my invention.

The air drawn or forced through the liquid in the receptacle A may be taken from the surrounding atmosphere, or it may be drawn through filtering substances and otherwise treated to purify it, and it may be raised to any temperature which may be deemed most effective.

I am aware that it has been proposed to facilitate acid fermentation by subjecting the liquor to an air-pressure upon the same in atmospheric pressure, and of exhausting the compressed air by an air-pump and then recharging the receptacle. I am also aware that it has been proposed to improve wine by placing the same in a closed vessel and forming a vacuum therein, and permitting the wine to remain a certain time in that condition. I am also aware that it has been proposed to purify alcohol by subjecting it to a current of ozone or ozonized air in a receptacle, where the alcohol is caused to pass downward in a finely-divided state and the ozonized air to pass upward therethrough. These processes I do not claim. I first cause air to pass upwardly through a body of the liquor to be aged, thereby aerating it to some degree, and then exhaust the air from the receptacle, forming a vacuum therein, and maintaining that vacuum as long as desired. The aeration of the liquor carries off some of the injurious properties and leaves the liquor in such a condition that when a vacuum is formed other objectionable properties are more easily removed.

What I claim, and desire to secure by Letters Patent, is—

1. The process of aging distilled liquors, which consists in passing currents of air through the same by placing the liquor in a closed receptacle, exhausting the air above the liquor, and admitting air beneath the same, then cutting off the air-supply and exhausting the air and volatile parts of the liquor, substantially as described.

2. The process of aging distilled liquors, which consists in passing currents of air through the same by placing the liquor in a closed receptacle, exhausting the air above the liquor, and admitting air beneath the same, then cutting off the air-supply and exhausting the air and volatile parts of the liquor, forming a vacuum and maintaining said exhaust until ebullition nearly or quite ceases, substantially as described.

In testimony whereof I affix my signature in presence of two witnesses.

WM. LEWIS HORNE.

Witnesses:
E. T. WALKER,
W. T. HORNE.